(12) United States Patent
Abhani et al.

(10) Patent No.: US 11,960,415 B2
(45) Date of Patent: Apr. 16, 2024

(54) PERFORMING SAVE STATE SWITCHING IN SELECTIVE LANES BETWEEN ELECTRONIC DEVICES IN UFS SYSTEM

(71) Applicant: SAMSUNG ELECTRONICS CO., LTD., Suwon-si (KR)

(72) Inventors: Dipakkumar Prafulkumar Abhani, Gujarat (IN); Shubham Garg, Delhi (IN); Ken Joseph Kannampuzha, Kerala (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 17/526,344

(22) Filed: Nov. 15, 2021

(65) Prior Publication Data

US 2022/0164296 A1 May 26, 2022

(30) Foreign Application Priority Data

Nov. 20, 2020 (IN) .................. 202041050543 (PS)
Jul. 16, 2021 (IN) .................. 202041050543 (CS)

(51) Int. Cl.
*G06F 13/16* (2006.01)
(52) U.S. Cl.
CPC ...... *G06F 13/1605* (2013.01); *G06F 13/1668* (2013.01)
(58) Field of Classification Search
CPC .................. G06F 13/1605; G06F 13/1668
See application file for complete search history.

(56) References Cited

U.S. PATENT DOCUMENTS

| 9,477,620 B2 * | 10/2016 | Kim ................ G06F 13/28 |
| 2014/0244904 A1 | 8/2014 | Kondo et al. |
| 2017/0222686 A1 | 8/2017 | Khan et al. |
| 2020/0341825 A1 | 10/2020 | Sudarmani et al. |
| 2021/0103393 A1 * | 4/2021 | Abhani ............. H04L 1/1896 |
| 2021/0334225 A1 * | 10/2021 | Seo ................. G06F 1/14 |

OTHER PUBLICATIONS

Communication dated Feb. 24, 2022 issued by the European Patent Office in counterpart European Application No. 21196814.4.

* cited by examiner

*Primary Examiner* — Brian T Misiura
(74) *Attorney, Agent, or Firm* — Sughrue Mion, PLLC

(57) ABSTRACT

Disclosed are a method and a Universal Flash Storage (UFS) system for performing save state switching using selective lanes between a first electronic device and a second electronic device. The method includes: determining, by the first electronic device, whether a data request is received from an application layer of the first electronic device; and performing, by the first electronic device, at least one of: setting a first lane from among a plurality of lanes between the first electronic device and the second electronic device to an active state and the other lanes from among the plurality of lanes to a power save state based on determining that the data request is not received from the application layer of the first electronic device; and setting the plurality of lanes between the first electronic device and the second electronic device to the active state based on determining that the data request is received from the application layer of the first electronic device.

17 Claims, 14 Drawing Sheets

Single Read Operation

PERFORMING SAVE STATE SWITCHING IN SELECTIVE LANES BETWEEN ELECTRONIC DEVICES IN UFS SYSTEM

CROSS-REFERENCE TO RELATED APPLICATIONS

This application is based on and claims priority from Indian Patent Provisional Application No. 202041050543 filed on Nov. 20, 2020 and Indian Patent Application No. 202041050543 filed on Jul. 16, 2021, the disclosures of which are incorporated herein in their entireties by reference.

BACKGROUND

1. Field

The present disclosure relates to a Universal Flash Storage (UFS) system, and more particularly, to a UFS system for performing save state switching using selective lanes between electronic devices in the UFS system.

2. Description of the Related Art

The Joint Electron Device Engineering Council (JEDEC) Universal Flash Storage (UFS) is specifically tailored for mobile applications and computing systems requiring high performance and low energy consumption. The JEDEC UFS leverages industry leading specifications including the MIPI M-PHY® v4.1 physical layer specification and a MIPI UniPro® v1.8 transport layer from the MIPI® Alliance for a UFS system.

In the UFS system, commands (e.g., read command, write command or the like) are initiated by one end of a link (e.g., dp-dn differential signaling) referred to as an initiator device, and the other end referred to as a target device works as a slave and processes the commands. In order to achieve a balance between energy consumption and a throughput, the UFS system offers multiple speeds versus power settings with an adjustable number of lanes or links (hereafter collectively referred to as "lanes"). For example, a speed mode regulates a speed of a data frame at the initiator device and the target device. The speed mode can be, for example, but not limited to, a fast mode, a fast auto mode, a PWM G1 mode, an HSG1 mode, an HSG2 mode, an HSG3 mode, and an HSG4 mode. In the HSG1 mode, a speed of the data frame transmission is 1,248 Mbps. In the HSG2 mode, a speed of the data frame transmission is 2,496 Mbps. Further, a configuration for the multiple speeds or the power settings is predominantly decided by the initiator device. During different read operations and data write requests where a majority of data transfer is expected in a single direction, there are some provisions in the UFS system to save power on an opposite side of a lane without compromising an overall throughput of the UFS system.

In case of the read operation, the target device receives a data request and waits for an application layer to provide requested data to send to the initiator device. The wait time is called latency of the initiator device and is unknown to the initiator device. During the wait time, both the initiator device and the target device side remain in an idle mode and dissipate power at the initiator device and the target device. Once the data is available to send from the target device, only a small bandwidth is required from the initiator device to send an acknowledgement for the received data, and thus, a majority of the bandwidth and power is wasted both at the initiator device and the target device.

In case of the data write request, the target device sends back a UFS specific ready to transfer (RTT) UFS protocol information unit (UPIU) to the initiator device. After receiving the RTT UPIU, the initiator device starts to transfer write data. At this time, only a small bandwidth is required from the target device to send an acknowledgement of the transferred data.

FIG. 1 is a signal timing diagram illustrating performance impact in a fast mode, according to a related art. Referring to FIG. 1, in order to deal with speed-power trade-off, a UFS system offers many speed modes. In the fast mode, all lanes are always active irrespective of a data transfer requirement. Whenever there is data to send, there is no latency as all lanes are always active. However, the fast mode is not much optimized in terms of power and consumes more power.

FIG. 2 is a signal timing diagram illustrating performance impact in a fast auto mode, according to a related art. Referring to FIG. 2, in the fast auto mode, when there is no data to send, all lanes can go to a save state for power saving. There is a significant latency of prepare length and synchronize length time in transitioning between the save state and an active state. If the initiator device or the target device operates in an auto mode, and close all active lanes when a lane is idle, an Acknowledgement and Flow Control (AFC) reaches late to the initiator device, which impacts an overall throughput of the UFS system. Thus, the fast auto mode is more optimized in terms of power while a throughput is compromised.

FIGS. 3 and 4 are signal timing diagrams illustrating a conventional scenario of data transfer at an initiator device, according to a related art.

As per a standard specification, a device can send outstanding 16 frames without receiving an AFC frame from a host. After sending 16 outstanding frames, the host is blocked for data transfer. As illustrated in FIG. 3, a group ACK is nine, and thus, a device RX buffer receives nine frames first, and then, it starts sending an AFC frame for the received data. After receiving nine frames, a device TX buffer is initiating a burst to send an AFC frame for first nine frames. However, since the device TX buffer is currently in a save state (auto mode), there is a latency of prepare plus sync length in sending an AFC frame for first nine frames. This time is greater than a time required by the host to send remaining seven frames (15-9). After sending all 16 frames, the host is blocked for data transfer as it has not received any AFC frame yet.

Now, since the host is blocked for data transfer, it moves to a save state. After some time, an AFC frame reaches to the host, and thus, the host again have to move to a burst state, and latency of prepare plus sync is added.

For a device, after sending an AFC frame for nine frames, it receives next seven frames, and then, does not receive anything for some time since the host is blocked during that time. So the device TX buffer also switches to a save state.

The above process is repeated, and due to continuous save-burst state switching, a throughput for data transfer is reduced.

Referring now to FIG. 4, a group ACK is seven, and thus, a device starts sending an AFC after receiving seven frames. Since a time to send remaining nine frames (15-7) is greater than save to burst state transition latency (prepare plus sync), a host always receive an AFC before sending all 16 outstanding frames, and thus, is never blocked for data transfer. Accordingly, no extra latency for repeated redundant save to burst state transitions as observed in the above case. However, due to this, a burst is always open in all lanes at the host as well as a device. So there is no power saving.

Further, referring to FIG. 3 and FIG. 4, it is considered that, in a conventional methods and systems, data transmission may be blocked because L2 flow control Credits/AFCs are not sent back quickly enough. Below are the use cases—

Case-1: If a Group ACK is greater than seven, a device will transition to STALL after sending Credits/ACKs and a host will be blocked repeatedly for data transmission as shown above which will impact performance.

Case-2: If an optimum value of Group ACK smaller than or equal to seven, a device burst will remain open if a host is continuously sending data.

L2 buffer calculations are as follows—
Configuration:
Gear—HSG4 Series-A
  Number of Active Lane—2
  Sync Length—1024 bytes

| Title | Value |
| --- | --- |
| Frame Size (in Bytes) | 272 |
| Max Outstanding Frames | 16 |
| Time per Frame | 0.135us |
| Time all Frames | 2.17 us |
| SYNC Time | 1.14us |
| Min STALL Time | 0.36us |

FIG. 5 is a graph illustrating burst and save state power, according to a related art.

FIG. 5 shows a power and latency tradeoff between a burst state and a save state. A horizontal axis is time, and a vertical axis is power consumption. The burst state consumes more power. Thus, in order to save power when there is no data to send, a UniPro activating physical layer (M-PHY) switches to a save state. However, there is a latency in switching from a save state to a burst state again.

Thus, there is a need for a method and a UFS system for performing save state switching using selective lanes between an initiator device and a target device in a UFS system.

SUMMARY

Embodiments of the inventive concept provide a method and a Universal Flash Storage (UFS) system for performing save state switching using selective lanes between a first electronic device and a second electronic device. When there is no data from a local application layer of the first electronic device, all lanes except a lane-0 are switched to a power save state. For example, when there is no data from local application layer, all lanes except the lane-0 are switched to the power save state. It is irrespective of data received by peer device. Thus, the UFS system is more optimized in terms of power.

In contrast, when there is data from the local application layer of the electronic device (an initiator device or a target device), the electronic device controls a plurality of lanes between the first electronic device and the second electronic device to be in the active state to achieve a maximum throughput from the first electronic device. Thus, the UFS system is more optimized in terms of throughput.

According to an embodiment, there is provided a method for performing save state switching in selective lanes between a first electronic device and a second electronic device in a UFS system. The method may include: determining, by the first electronic device, whether a data request is received from an application layer of the first electronic device; and performing, by the first electronic device, at least one of: setting a first lane from among a plurality of lanes between the first electronic device and the second electronic device to an active state and the other lanes from among the plurality of lanes to a power save state based on determining that the data request is not received from the application layer of the first electronic device; and setting the plurality of lanes between the first electronic device and the second electronic device to the active state based on determining that the data request is received from the application layer of the first electronic device. The method may further include: based on the setting the first lane to the active state, transmitting, by the first electronic device, one of an Acknowledgement and Flow Control (AFC) frame and credit information corresponding to data, from the second electronic device, to the second electronic device using the first lane; and based on the setting the plurality lanes to the active state, transmitting data from the first electronic device to the second electronic device using at least one lane from among the plurality of lanes.

In an embodiment, the data request received from the application layer of the first electronic device may indicate one of a data read request and a data write request at the first electronic device.

In an embodiment, the first electronic device may be an initiator device and the second electronic device may be a target device.

In an embodiment, the first electronic device may be a target device and the second electronic device may be an initiator device.

According to an embodiment, there is provided a UFS system for performing save state switching using selective lanes. The UFS system may include: a first electronic device; and a second electronic device communicatively coupled to the first electronic device using a plurality of lanes, wherein the first electronic device includes: a UFS memory configured to support one or more power save states, and a lane controller configured to: determine whether a data request is received from an application layer of the first electronic device; and perform at least one of: setting a first lane from among the plurality of lanes to an active state and the other lanes from among the plurality of lanes to a power save state based on determining that the data request is not received from the application layer of the first electronic device; and setting the plurality of lanes to the active state based on determining that the data request is received from the application layer of the first electronic device.

These and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the scope of the inventive concept, and the embodiments herein include all such modifications.

BRIEF DESCRIPTION OF DRAWINGS

A method and a Universal Flash Storage (UFS) system are illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
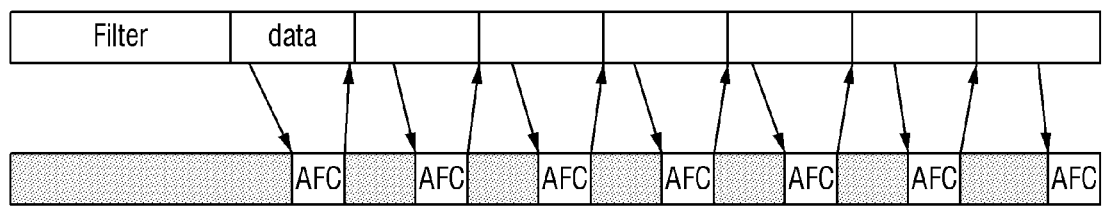
FIG. 1 is a signal timing diagram illustrating performance impact in a fast mode, according to a related art.
Figure 2:
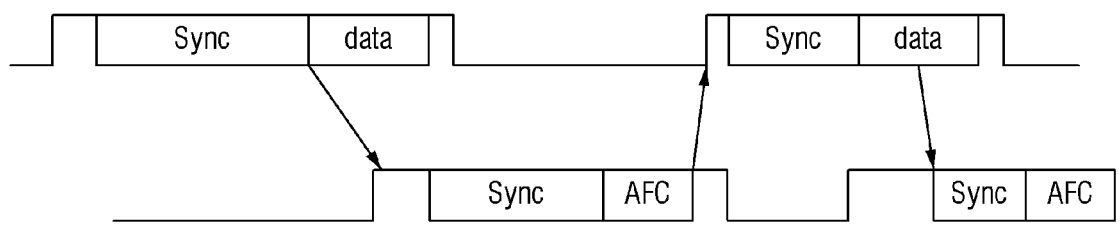
FIG. 2 is a signal timing diagram illustrating performance impact in a fast auto mode, according to a related art.
Figure 3:
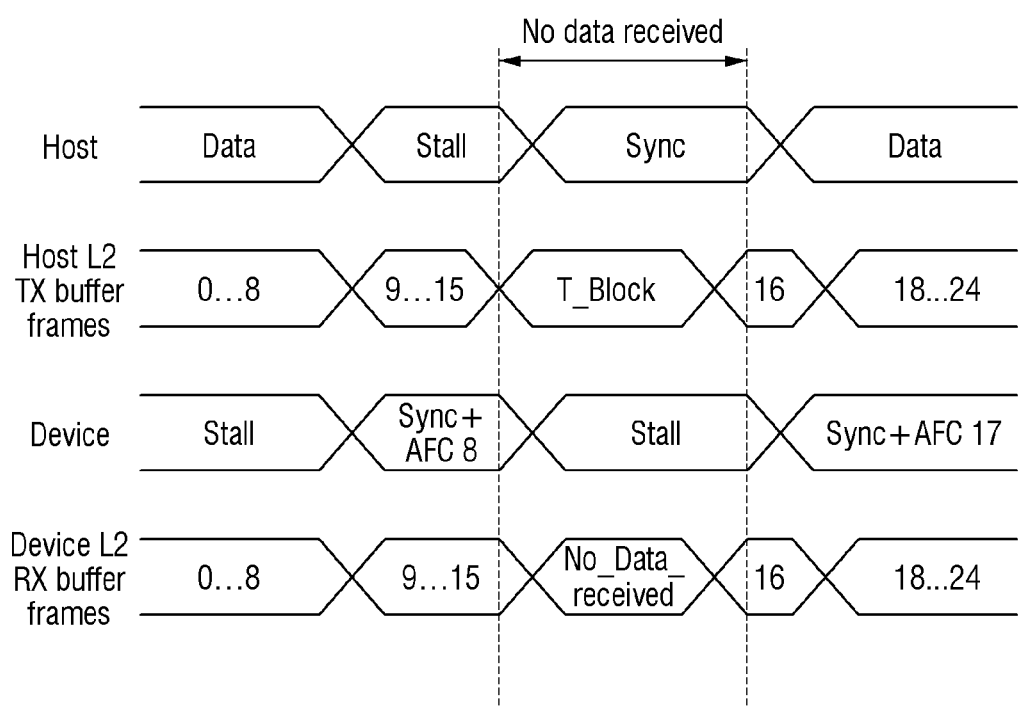
FIGS. 3 and 4 are signal timing diagrams illustrating a conventional scenario of data transfer at an initiator device, according to a related art.
Figure 4:
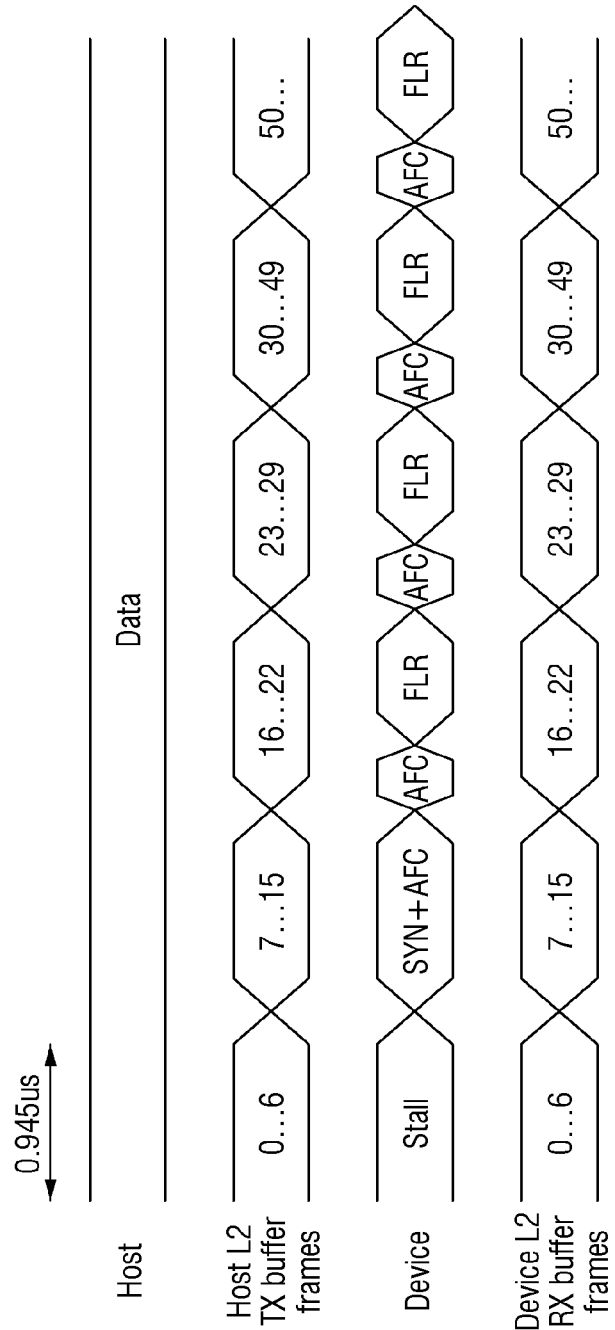
Figure 5:
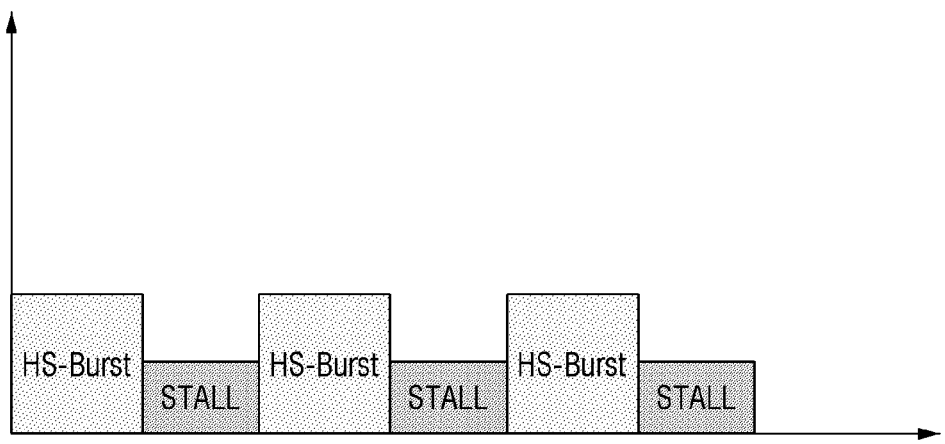
FIG. 5 is a graph illustrating burst and save state power, according to a related art.

The embodiments provided herein are all example embodiment, and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, an embodiment provides a method and a UFS system for performing save state switching using selective lanes between a first electronic device and a second electronic device. The method includes detecting, by the first electronic device, whether a data request is received from an application layer of the first electronic device. The method includes, in response to determining that the data request is not received from application layer of the first electronic device, configuring a first lane from among a plurality of lanes between the first electronic device and the second electronic device in an active state, and the remaining lanes from among the plurality of lanes in a power save mode for regulating power of the first electronic device, and transmitting one of an Acknowledgement and Flow Control (AFC) frame and credit information corresponding to data, from the second electronic device, to the second electronic device using the first lane. The method further includes that, in response to determining that the data request is received from the application layer of the first electronic device, configuring the plurality of lanes between the first electronic device and the second electronic device in the active state to achieve a maximum throughput from the first electronic device, and transmitting data from the first electronic device to the second electronic device using at least one lane from among the plurality of links.

In the above method, the first electronic device determines whether the data request is received from the application layer of the first electronic device. If the data request is not received from application layer of the first electronic device then, the first electronic device sets the first lane from among the plurality of lanes between the first electronic device and the second electronic device to the active state, and the remaining lanes from among the plurality of lanes to the power save mode for regulating power of the first electronic device. Thus, the UFS system is more optimized in terms of power.

In the above method, if the data request is received from the application layer of the first electronic device then, the first electronic device sets the plurality of lanes between the first electronic device and the second electronic device to the active state to achieve a maximum throughput from the first electronic device. Thus, the UFS system is more optimized in terms of throughput.

Referring now to the drawings and more particularly to FIGS. 6 through 15, where similar reference characters denote corresponding features consistently throughout the figures, the embodiments are provided in more detail.

Figure 6:
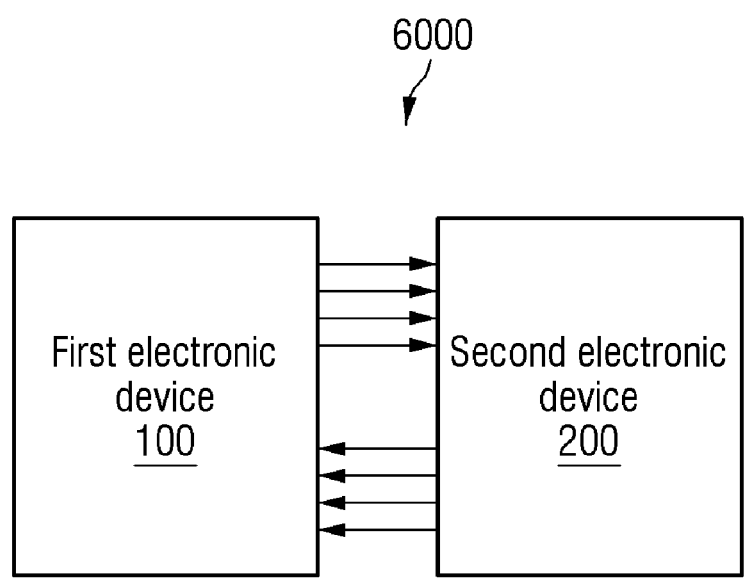
FIG. 6 illustrates a UFS system, according to an embodiment.

FIG. 6 illustrates a UFS system 6000, according to an embodiment. The UFS system 6000 includes a first electronic device 100 and a second electronic device 200. The UFS system 6000 can be a flash memory system defined by the Joint Electron Device Engineering Council (JEDEC) standard, designed for a high data transfer speed and low energy consumption. In an embodiment, the first electronic device 100 is an initiator device and the second electronic device 200 is a target device. In another embodiment, the first electronic device 100 may be the target device and the second electronic device 200 may be the initiator device.

The initiator device and the target device each may be a flash storage device. Examples of the initiator device and the target device may be, but is not limited to, a smart phone, a laptop computer, a tablet, a flexible device, an internet of things (IoT) device, etc. The initiator device and the target device may be an embedded device within an electronic device, or may be integrated into a removable card for flexible use with different electronic devices.

The first electronic device 100 detects whether a data request is received from a local application layer of the first electronic device 100. In an embodiment, the data request received from the application layer of the first electronic device 100 indicates one of a data read request and a data write request at the first electronic device 100.

If the data request is not received from the local application layer of the first electronic device 100, then the first electronic device 100 sets a first lane from among a plurality of lanes between the first electronic device 100 and the second electronic device 200 to an active state and the remaining lanes from among the plurality of lanes to a power save mode for regulating power of the first electronic device 100. The lane can be, for example, but not limited to a wireless communication link, a serial point-to-point link, a transmission line, a copper line, an optical line, and an infrared communication link. The lane refers to a connection between the initiator device and the target device. The lane may support one lane. Each lane representing a set of differential signal pairs (one pair for transmission, one pair for reception). To scale a bandwidth, the lane may aggregate multiple lanes denoted by xN, where N is any supported lane bandwidth, and x is an integer greater than 0. Further, the first electronic device 100 transmits at least one of an AFC frame and credit information corresponding to data, from the second electronic device, to the second electronic device 200 using the first lane.

In the present embodiment, the first lane set to the active state is indicated as one single lane, more than one lane among the plurality lanes may be selected and set to the active state when it is determined that the data request is not received from the local application layer of the first electronic device 100, according to an embodiment.

In an embodiment, the credit information is used to determine a buffer space available at a peer end. For example if a host wants to send data to a device, it will use credit information to check how much buffer space is available at the device, and send the data accordingly.

If the data request is received from an application layer of the first electronic device 100, the first electronic device 100 sets the plurality of lanes between the first electronic device 100 and the second electronic device 200 to an active state to achieve a maximum throughput from the first electronic device 100. The first electronic device 100 transmits the data from the first electronic device 100 to the second electronic device 200 using at least one lane from the plurality of links.

In a current UFS system, different speeds and power saving states are defined. However, still in the cases where no traffic is available from an application layer, and a target device only needs to send an AFC frame for received data, which requires a very small bandwidth, power is unnecessarily dissipated in multiple lanes. Further, the current UFS system is not flexible in terms of burst open/close dynamically required lanes and keeping other lanes in a save state. Consider an example, referring to the FIG. 6, the UFS system 6000 works as follows:

1. When a target device has a traffic only from an initiator device, a link layer of the target device will keep a lane-0 in an active state to send at least one of an AFC frame and credit information to the initiator device, the other lanes dynamically switch off in a power saving state or a save state.
2. When the target device have a traffic from its own application layer, the link layer of the target device will dynamically switch all available lanes to the active state to achieve a required throughput.
3. When the initiator device have a traffic only from the target device, a link layer of the initiator device will keep a lane-0 in the active state to send at least one of an AFC frame and credit information to the target device, and the other lanes expect the lane-0 dynamically switch to the power saving state to save power.
4. When the initiator device has a traffic from its own application layer, the link layer of the initiator device will dynamically switch all available lanes to the active state to achieve a required throughput.
5. The initiator device and the target device will keep selective lanes in the power saving state based on a data traffic and regardless of the fast mode or the fast auto dynamic mode.

Figure 7A:
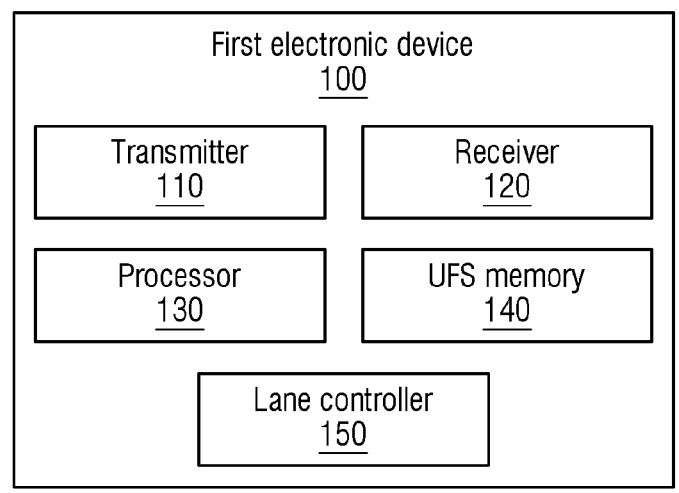
FIG. 7A shows various hardware components of an initiator device, according to an embodiment.

FIG. 7A illustrates various hardware components of the first electronic device 100, according to an embodiment. The first electronic device 100 includes a transmitter 110, a receiver 120, a processor 130, a UFS memory 140, and a lane controller 150. The processor 130 is connected to the transmitter 110, the receiver 120, the UFS memory 140, and the lane controller 150.

The lane controller 150 is configured to determine whether the data request is received from the application layer of the first electronic device 100. If the data request is not received from the application layer of the first electronic device 100, the lane controller 150 sets the first lane from among the plurality of lanes between the first electronic device 100 and the second electronic device 200 to the active state and the remaining lanes from among the plurality of lanes to the power save mode for regulating power of the first electronic device 100. Further, the lane controller 150 transmits at least one of the AFC frame and credit information corresponding to data, from the second electronic device, to the second electronic device 200 using the first lane.

In an embodiment, the credit information is used to determine a buffer space available at the first electronic device 100. Here, the buffer space may be an available space (or size) of a receiver buffer of the first electronic device 200. For example if a host wants to send data to a device, it will use credit information to check how much buffer space is available at the device and send the data accordingly.

If the data request is received from the application layer of the first electronic device 100, the lane controller 150 sets the plurality of lanes between the first electronic device 100 and the second electronic device 200 to the active state to achieve a maximum throughput from the first electronic device 100. The lane controller 150 transmits data from the first electronic device 100 to the second electronic device 200 using at least one lane from the plurality of links.

The lane controller 150 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The lane controller 150 may, for example, be embodied in one or more semiconductor chips, or on substrate supports such as printed circuit boards and the like. The circuits constituting a block may be implemented by dedicated hardware, or by a processor e.g., one or more programmed microprocessors and associated circuitry, or by a combination of dedicated hardware to perform some functions of the block and a processor to perform other functions of the block.

The processor 130 is configured to execute instructions stored in the UFS memory 140 and to perform various processes. The processor 130 may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 130 may include multiple cores and is configured to execute the instructions stored in the UFS memory 140.

The one or a plurality of processors control processing of input data in accordance with a predefined operating rule or artificial intelligence (AI) model stored in a non-volatile memory and a volatile memory. The predefined operating rule or AI model is provided through training or learning.

The UFS memory 140 also stores instructions to be executed by the processor 130. The UFS memory 140 stores a status of the lanes. The UFS memory 140 may include non-volatile storage elements. In addition, the UFS memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 can be configured to store a larger amount of information. In certain examples, a non-transitory storage medium may store data that can, over time, change (e.g., in Random Access Memory (RAM) or cache).

The transmitter 110 is configured for communicating internally between internal hardware components and with external devices via one or more networks. The transmitter 110 may be, for example, but not limited to, at least one of a Bluetooth transmitter, a Wireless Fidelity (Wi-Fi) module, and a Li-Fi module including any one or any combination of a digital modem, a radio frequency (RF) modem, a WiFi chip, and related software and/or firmware. The receiver 120 is configured for communicating internally between internal hardware components and with external devices via one or more networks. The receiver 120 may be, for example, but not limited to, at least one of a Bluetooth receiver, a Wireless fidelity Wi-Fi receiver, and a Li-Fi receiver including any one or any combination of a digital modem, a radio frequency (RF) modem, a WiFi chip, and related software and/or firmware.

Further, the initiator device 100 may include a memory core, which may include one or more banks, arrays, and/or other organization of the memory cells, e.g., designed using flash memory technology such as NAND flash memory cells.

Although the FIG. 6 shows various hardware components of the initiator device 100, but it is to be understood that other embodiments are not limited thereon. In other embodiments, the initiator device 100 may include less or more number of components. Further, the labels or names of the components are used only for illustrative purpose and do not limit the scope of the inventive concept. One or more components can be combined together to perform same or substantially similar function for autonomous detection of the status of the lanes between the initiator device 100 and the target device 200 in the UFS system.

Figure 7B:
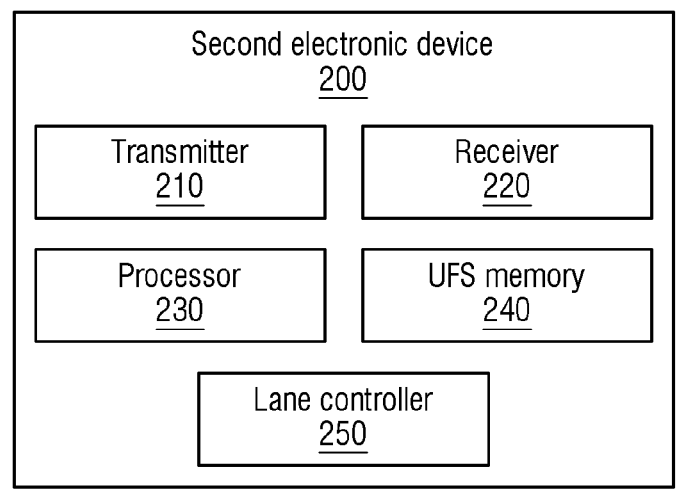
FIG. 7B illustrates various hardware components of a target device, according to an embodiment.

FIG. 7B illustrates various hardware components of the second electronic device 200, according to an embodiment. The operations and functions of the second electronic device 200 may be similar to the first electronic device 100. For the sake of brevity, the operations and functions of the second electronic device 200 are not repeated.

Figure 8:
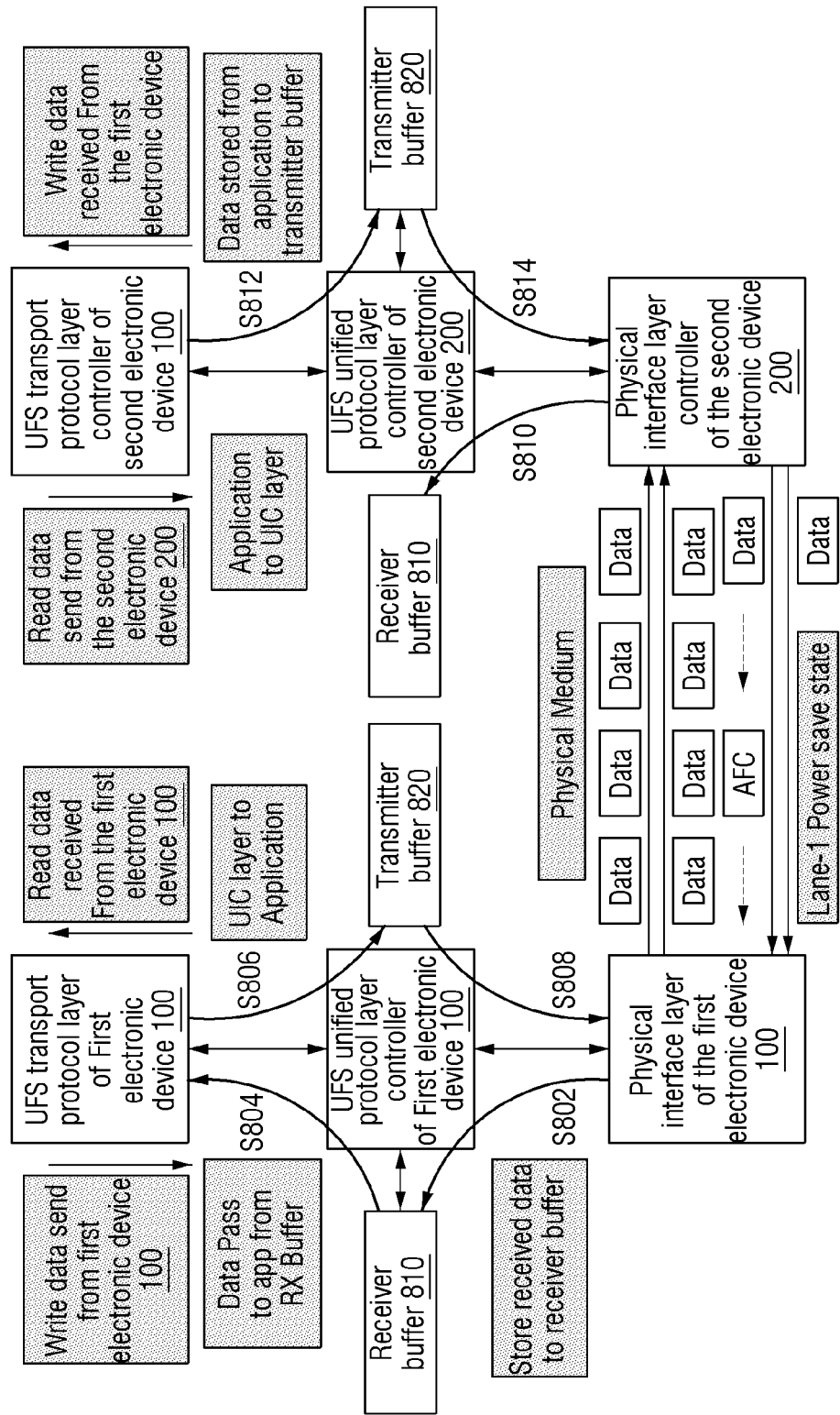
FIG. 8 illustrates data flow in a UFS system with save state switching in selective lanes when a target device is in an idle mode, according to an embodiment.

FIG. 8 illustrates layer level data flow in the UFS system 6000 with save state switching in selective lanes when a target device is in an idle mode, according to an embodiments.

At operation S802, a physical interface layer of the first electronic device 100 receives a data frame from the second electronic device 100, when the first electronic device 100 is in a lane-1 power save state. The physical interface layer of the first electronic device 100 sends the received data frame to a receiver buffer 810. The receiver buffer 810 stores the received data frame.

At operation S804, the receiver buffer 810 sends the received data to a UFS transport protocol layer of the first electronic device 100.

At S806, when a traffic is coming from an application layer to a UniPro transmitter buffer 820, a UniPro activating physical layer (M-PHY) sends read data.

At S808, an UFS interconnect (UIC) layer receives the read data and share the read data with the UFS transport protocol layer. The UFS transport protocol layer writes a data frame to be sent from the first electronic device 100. The UFS transport protocol layer passes the data frame to the application layer, where the data frame is stored in the UniPro transmitter buffer 820.

Similar operations S810 to S814 are performed in the second electronic device 200. Data is received at a target device physical layer and passed to a target device UniPro receiver buffer (S810). From the receiver buffer, data is passed to a target device application layer. Similarly, data transfer happens in an opposite direction.

As shown in the FIG. 8, data transfer is performed between an initiator device and a target device in the above method. Here, the initiator device is the first electronic device 100, and the target device is the second electronic device 200. Initially only the initiator device has a traffic from its application layer while the target device has no traffic from its application layer. Thus, in the initiator device to the target device direction, all lanes are kept in an active state for a maximum throughput while as only an AFC frame is needed in an opposite direction. In this case, only a lane-0 of the target device to the initiator device direction is active for maximum power saving.

After some time, the target device also receives a traffic from its application layer, and thus, all lanes are activated in the target device to the initiator device direction for a maximum throughput.

In the above method, power saving is achieved without compromising a throughput.

Figure 9:
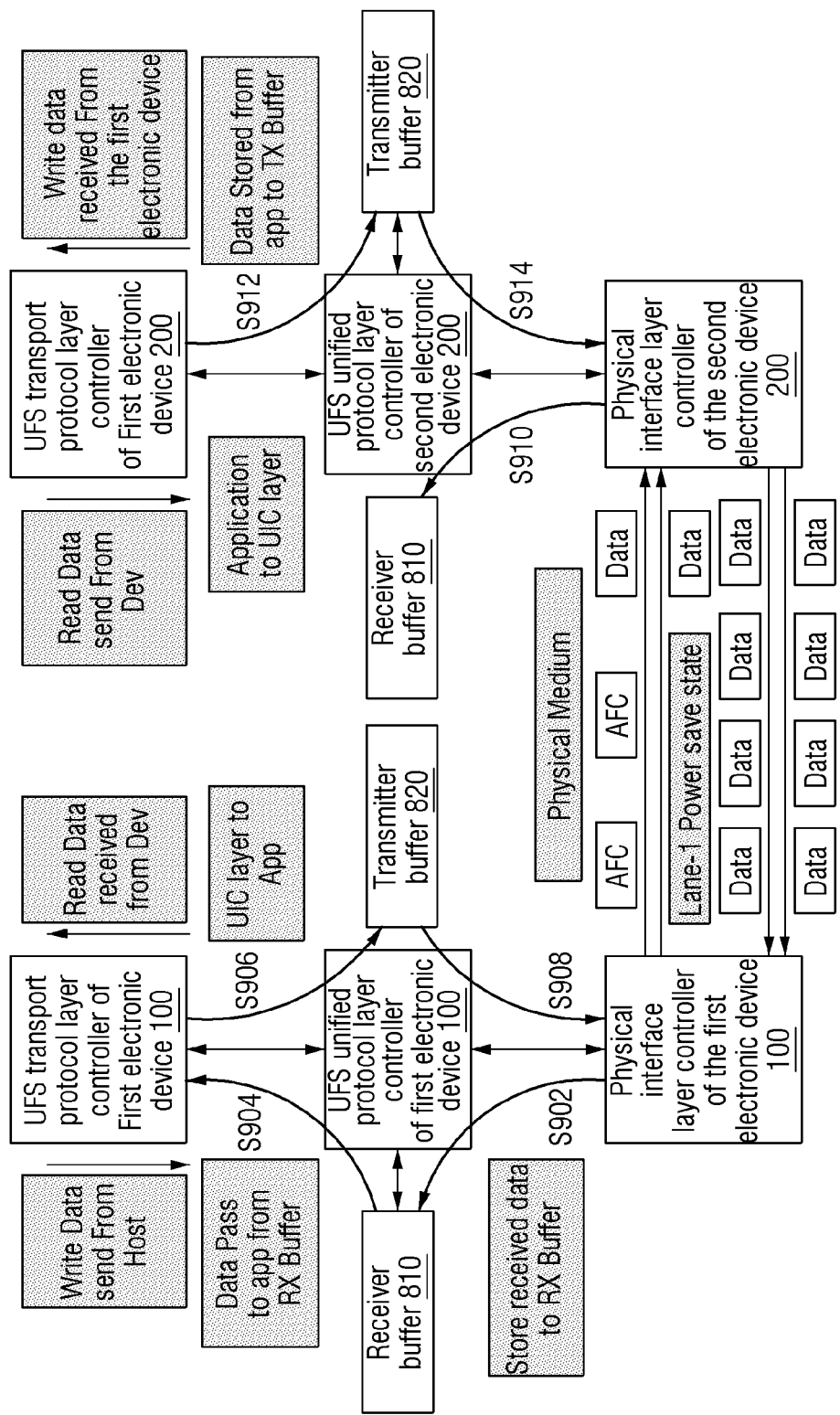
FIG. 9 illustrates data flow in a UFS system with save state switching in selective lanes when an initiator device is in an idle mode, according to an embodiment.

FIG. 9 illustrates layer level data flow in the UFS system 6000 with save state switching in selective lanes, when an initiator device is in an idle mode, according to an embodiment. This example is similar to FIG. 8. Here, initially, both a target device and an initiator device have a traffic from their respective application layers, and thus, all lanes are active in both directions. After some time, the traffic stops from the application layer of the initiator device. At this time, except a lane-0, all the other lanes in the initiator device to the target device direction switch to a save state to save power. All other functionality is similar to the FIG. 8.

At operation S902, the physical interface layer of the first electronic device 100 receives a data frame from the second electronic device 100. The physical interface layer of the first electronic device 100 sends the received data frame to the receiver buffer 810. The receiver buffer 810 stores the received data frame.

At operation S904, the receiver buffer 810 sends the received data to a UFS transport protocol layer of the first electronic device 100.

At operation S906, when a traffic is coming from the application layer to a UniPro transmitter buffer 820, the UniPro activating physical layer (M-PHY) sends read data.

At operation S908, the UIC layer receives the read data and share the read data with the UFS transport protocol layer. The UFS transport protocol layer writes a data frame send from the first electronic device 100. The UFS transport protocol layer passes the data frame to the application layer, where the data frame is stored in the UniPro transmitter buffer 820.

Similar operations S910 to S914 are performed in the second electronic device 200.

Figure 10:
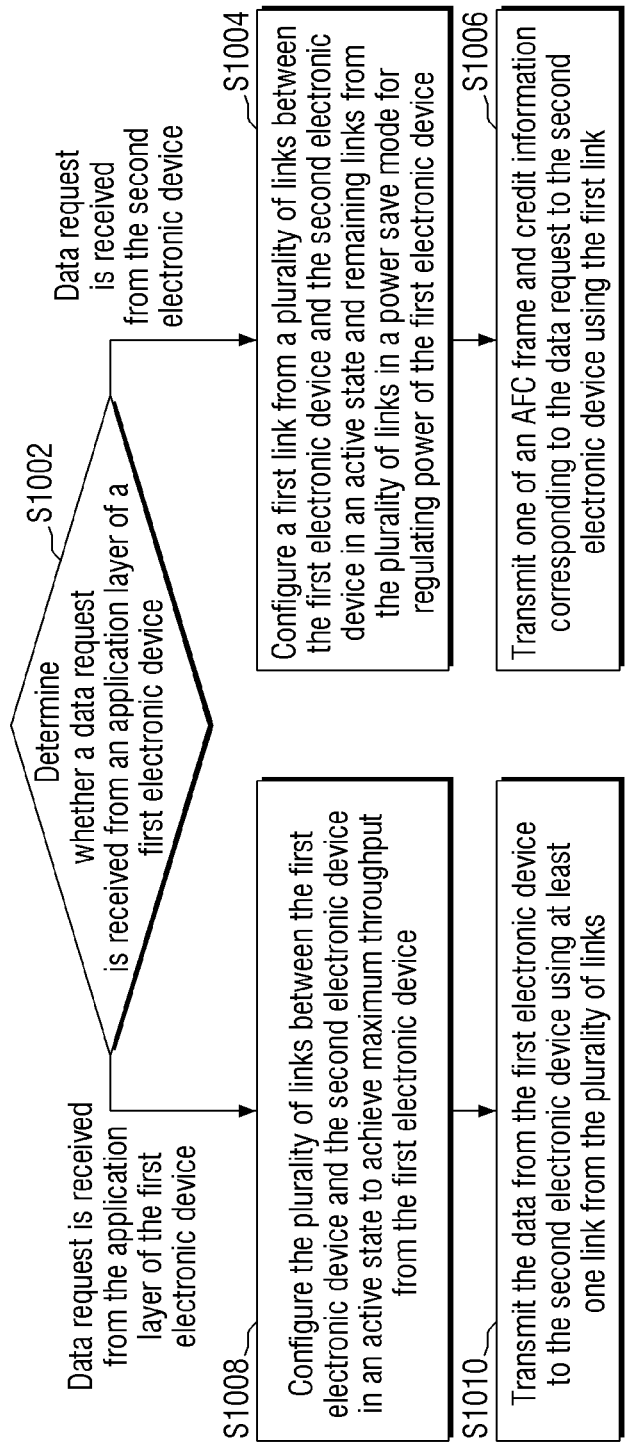
FIG. 10 illustrates a flowchart of a method for performing save state switching using selective lanes between a first electronic device and a second electronic device in a UFS system, according to an embodiment.

FIG. 10 illustrates a flowchart of a method for performing save state switching using selective lanes between the first electronic device 100 and the second electronic device 200 in the UFS system 6000, according to an embodiment. Operations S1002 to 51010 are performed by the lane controller 150 of the first electronic device 100 or the lane controller 250 of the second electronic device 200.

At operation S1002, it is determined whether a data request is received from the application layer of the first electronic device 100.

If the data request is not received from the application layer of the first electronic device 100, at operation S1004, a first lane from among a plurality of lanes between the first electronic device 100 and the second electronic device 200 is set to an active state and the remaining lanes from among the plurality of lanes are set to a power save mode for regulating power of the first electronic device 100.

At operation S1006, one of an AFC frame and credit information corresponding to data, from the second electronic device, to the second electronic device 100 using the first lane.

If the data request is received from the application layer of the first electronic device 100, at operation S1008, the plurality of lanes between the first electronic device 100 and the second electronic device 200 are set to the active state to achieve a maximum throughput from the first electronic device 100.

At operation 51010, data from the first electronic device 100 is transmitted to the second electronic device 200 using a selected lane from among the plurality of links.

The various actions, acts, blocks, steps, or the like in the flowchart shown in FIG. 10 may be performed in the order presented, in a different order or simultaneously. Further, in some embodiments, some of the actions, acts, blocks, steps, or the like may be omitted, added, modified, skipped, or the like without departing from the scope of the invention.

Figure 11:
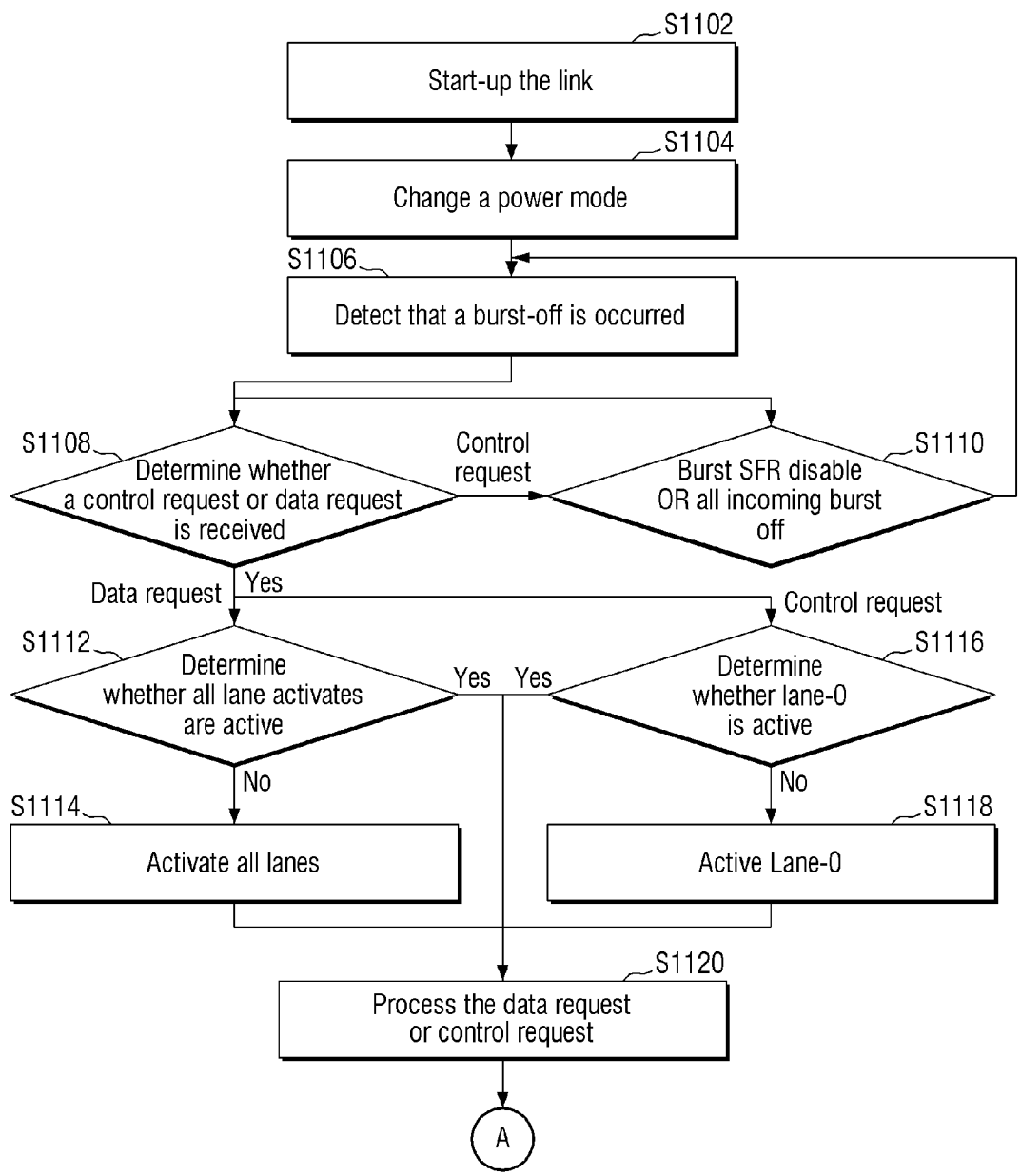
FIGS. 11 and 12 illustrate a flowchart of various operations for performing save state switching using selective lanes between a first electronic device and a second electronic device in a UFS system, according to an embodiment.
Figure 12:
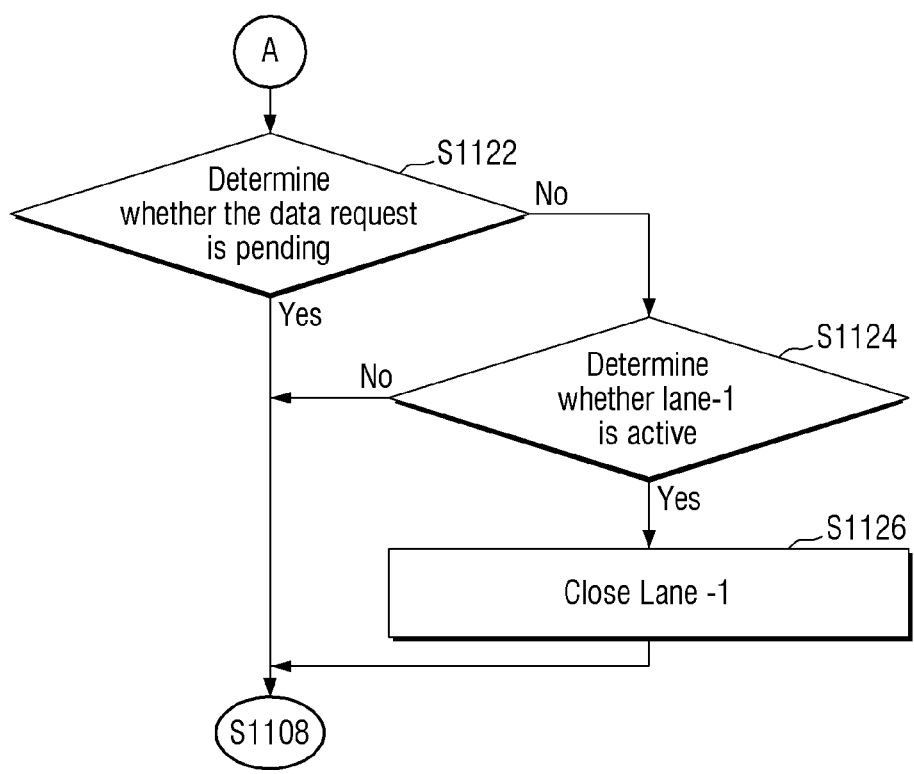

FIGS. 11 and 12 illustrate a flowchart of various operations for performing save state switching using selective lanes between the first electronic device 100 and the second electronic device 200 in the UFS system 6000, according to an embodiment. Operations S1102 to S1126 are performed by the lane controller 150 of the first electronic device 100 or the lane controller 250 of the second electronic device 200.

At operation S1102, a lane between the first electronic device 100 and the second electronic device 200 is started up.

At operation S1104, a power mode is changed.

At operation S1106, occurrence of a burst-off is detected.

At operation S1108, it is determined whether a control request or a data read request is received.

If the control request is received, at operation S1110, a burst SFR is disabled or all incoming burst is turned off.

If the data read request is received, at operation S1112, it is determined whether all lane activates are active.

If all lane activates are active, at operation S1120, the data read request is processed.

If all lane activates are not active, at operation S1114, all lanes are activated.

If the control request is received, at operation S1116, it is determined whether a lane-0 is active.

If the lane-0 is active, at operation S1120, the control request is processed.

If the lane-0 is not active at operation S1118, the lane-0 is activated.

At operation S1122, it is determined whether the data read request is pending.

If the data read request is pending, at operation S1108, it is determined whether the control request or the data read request is received.

If the data read request is not pending, at S1124, whether a lane-1 is active.

If the lane-1 is active, at operation S1126, the lane-1 is closed.

If lane-1 is not active, at S1108, it is determined whether the control request or the data read request is received.

The various actions, acts, blocks, steps, or the like in the above flowchart may be performed in the order presented, in a different order or simultaneously.

Further, in some embodiments, some of the actions, acts, blocks, steps, or the like may be omitted, added, modified, skipped, or the like without departing from the scope of the invention.

Figure 13:
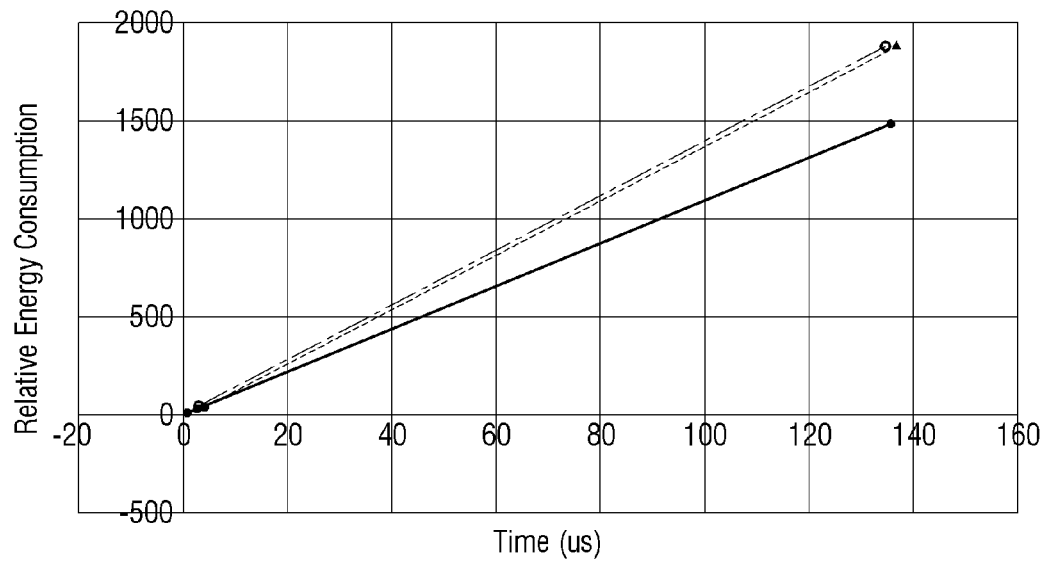
FIG. 13 illustrates an energy consumption difference with respect to a fast mode, a fast auto mode and a mode of an embodiment for a write operation.

FIG. 13 illustrates an energy consumption difference with respect to a fast mode, a fast auto mode, and a mode of an embodiment for a write operation.

During a single data write request, an initiator device operates in an HSG4 series-A mode, a data frame size of the initiator device is 256 KB, and total lanes of the initiator device is two (2). Further, below are an energy savings level:

1. With respect to Fast Mode—21.16%
2. With respect to Fast Auto Mode—21.10%

Energy consumption comparison of a fast mode, a fast auto mode and a mode of the present embodiment for the single write operation.
   i. Time taken for a write operation is nearly the same for all three modes (marginally higher in case of fast auto mode due to a save to a burst transition latency)
   ii. Energy consumption in the fast mode and the fast auto mode is nearly the same since, also in the fast auto mode, all lanes are active for data transfer considering a group smaller than or equal to seven)

iii. Energy consumption in the mode of the present embodiment is the lowest since all lanes are active only in a data transfer direction. For transmitting an AFC frame, only a lane-0 is active while all the other lanes are in a save state.

Figure 14:
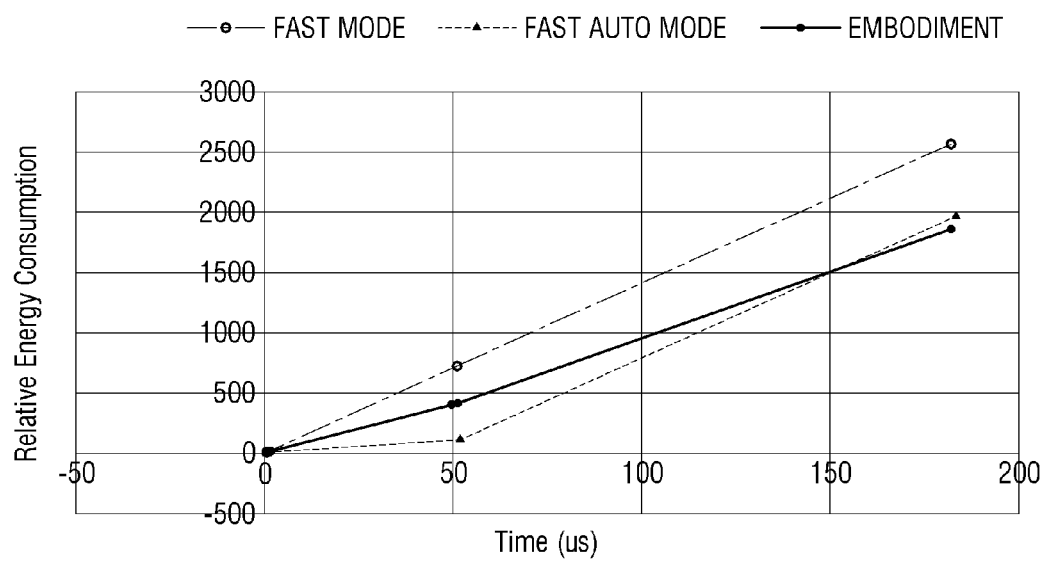
FIG. 14 illustrates an energy consumption difference with respect to a fast mode, a fast auto mode and a mode of an embodiment for a read operation.

FIG. 14 illustrates an energy consumption difference with respect to a fast, a fast auto mode, and a mode of an embodiment for a read operation.

During a single read operation, the initiator device operates in a Gear—HSG4 Series-A mode, a data size of the initiator device is 256 KB, total lanes of the initiator device is two (2), and a read latency is 50 μs. Further, below are an energy savings level:

1. With respect to Fast Mode—27.33%
2. With respect to Fast Auto Mode—5.09%

Figure 15:
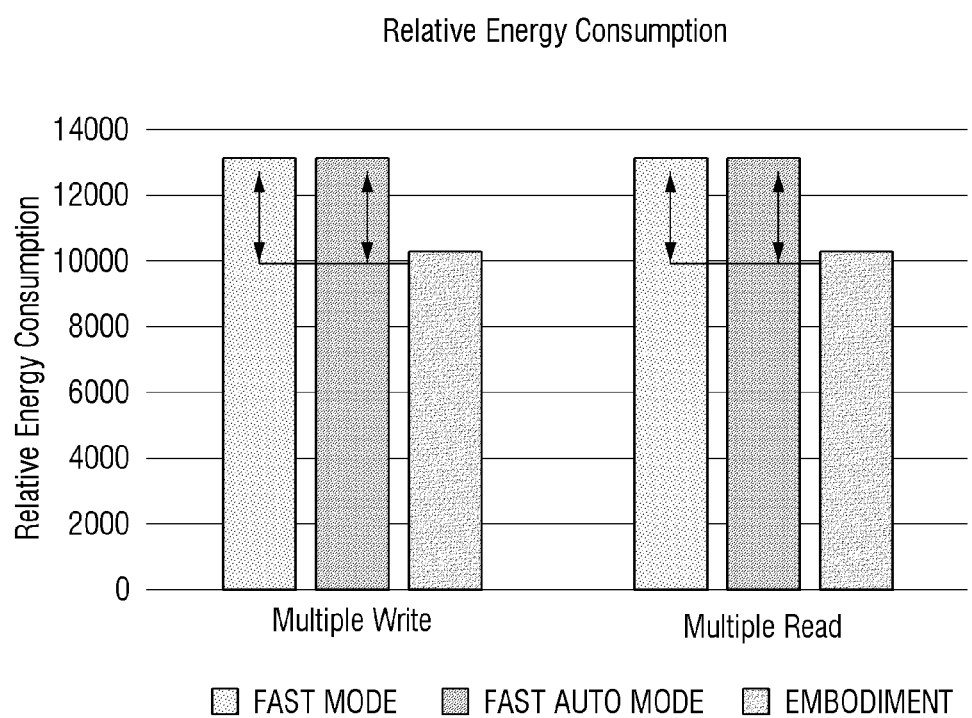
FIG. 15 illustrates multiple read/data write request calculations of a UFS system, according to an embodiment.

FIG. 15 illustrates multiple read/data write request calculations of a UFS system according to an embodiment.

It is noted from FIG. 15 that a multiple read/data write request calculation according to the present embodiment has following details: Gear—HSG4 Series-A, Data Size—256 KB, Outstanding Commands—72, and Number of Lanes—2.

Energy consumption comparison of the fast mode, the fast auto mode and the mode of the embodiment for the multi-read operation is as follows.

The energy consumption of the fast mode is the highest as all lanes are always active. In the fast auto mode, all lanes switches to a saves state during the time of read latency, while in the mode of the embodiment, depending on a traffic availability, selective lanes are kept in an active state. Thus, the mode of the embodiment shows the least energy consumption.

The foregoing description of the embodiments will so fully reveal the general nature of the embodiments, and thus, others may, by applying the above embodiment, readily modify and/or adapt for various applications without departing from the inventive concept. Such adaptations and/or modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the inventive concept.

What is claimed is:

1. A method for performing save state switching in selective lanes between a first electronic device and a second electronic device in a Universal Flash Storage UFS system, the method comprising:
    determining, by the first electronic device, whether a data request is directly received from an application layer of the first electronic device;
    performing, by the first electronic device, at least one of:
        setting a first lane from among a plurality of lanes between the first electronic device and the second electronic device to an active state and the other lanes from among the plurality of lanes to a power save state based on determining that the data request is not received from the application layer of the first electronic device; and
        setting the plurality of lanes between the first electronic device and the second electronic device to the active state based on determining that the data request is received from the application layer of the first electronic device,
    based on the setting the first lane to the active state, transmitting, by the first electronic device, one of an Acknowledgement and Flow Control (AFC) frame and credit information corresponding to data, from the first electronic device, to the second electronic device using the first lane; and
    based on the setting the plurality lanes to the active state, transmitting data from the first electronic device to the second electronic device using at least one lane from among the plurality of lanes.

2. The method of claim 1, wherein the credit information is used to determine a buffer space available at the first electronic device.

3. The method of claim 1, wherein the data request received from the application layer of the first electronic device indicates one of a data read request and a data write request at the first electronic device.

4. The method of claim 1, wherein the first electronic device is an initiator device and the second electronic device is a target device.

5. The method of claim 1, wherein the first electronic device is a target device and the second electronic device is an initiator device.

6. A Universal Flash Storage (UFS) system for performing save state switching using selective lanes, the UFS system comprising:
    a first electronic device; and
    a second electronic device communicatively coupled to the first electronic device using a plurality of lanes,
    wherein the first electronic device comprises:
    a UFS memory configured to support one or more power save states, and a lane controller configured to:
        determine whether a data request is directly received from an application layer of the first electronic device; and
    perform at least one of:
        setting a first lane from among the plurality of lanes to an active state and the other lanes from among the plurality of lanes to a power save state based on determining that the data request is not received from the application layer of the first electronic device; and
        setting the plurality of lanes to the active state based on determining that the data request is received from the application layer of the first electronic device,
    wherein the lane controller is further configured to perform:
        based on the setting the first lane to the active state, transmitting at least one of an Acknowledgement and Flow Control (AFC) frame and credit information corresponding to data, from the first electronic device, to the second electronic device using the first lane; and
        based on the setting the plurality lanes to the active state, transmitting data from the first electronic device to the second electronic device using at least one lane from among the plurality of lanes.

7. The UFS system of claim 6, wherein the credit information is used to determine a buffer space available at the first electronic device.

8. The UFS system of claim 6, wherein the data request received from the application layer of the first electronic device indicates one of a data read request and a data write request at the first electronic device.

9. The UFS system of claim 6, wherein the first electronic device is an initiator device and the second electronic device is a target device.

10. The UFS system of claim 6, wherein the first electronic device is a target device and the second electronic device is an initiator device.

11. A Universal Flash Storage (UFS) device comprising:
a transmitter configured to transmit first data to another UFS device;
a receiver configured to receive second data from the other UFS device; and
a lane controller configured to:
set at least one lane from among a plurality of lanes connecting the UFS device to the other UFS device to an active state, and the other lanes from among the plurality of lanes to a power save state, based on determining that a data request is not directly received from an application layer of the UFS device; and
set the plurality of lanes to the active state, based on determining that the data request is received from the application layer of the UFS device,
wherein the UFS device further comprises a transmitter buffer, and
wherein the lane controller is configured to set the at least one lane from among the plurality lanes to the active state, based on determining that the transmitter buffer does not have a data traffic coming from the application layer.

12. The UFS device of claim 11, wherein the data traffic comprises the first data for the UFS device to send to the other UFS device through the transmitter.

13. The UFS device of claim 11, further comprising a receiver buffer,
wherein the lane controller is configured to set the at least one lane from among the plurality lanes to the active state based on determining that the receiver buffer has received a data traffic coming from the other UFS device.

14. The UFS device of claim 11, wherein the lane controller is further configured to, based on the setting the at least one lane to the active state, transmit at least one of an Acknowledgement and Flow Control (AFC) frame and credit information, corresponding to the second data, to the other UFS device through the at least one lane; and
based on the setting the plurality lanes to the active state, transmitting the first data to the other UFS device through one or more lanes from among the plurality of lanes.

15. The UFS device of claim 14, wherein the credit information is used to determine an available buffer space of a receiver buffer of the UFS device.

16. The UFS device of claim 14, wherein the data request received from the application layer of the UFS device indicates one of a data read request and a data write request at the UFS device.

17. The UFS device of claim 11, wherein the at least one lane is one lane from among the plurality lanes.

* * * * *